United States Patent [19]
Hummel

[11] Patent Number: 5,609,291
[45] Date of Patent: Mar. 11, 1997

[54] EXPANDABLE TOOL FOR HOLDING AND ALIGNING PIPES TO BE WELDED

[76] Inventor: Jon C. Hummel, 210 W. Front St., Perrysburg, Ohio 43551

[21] Appl. No.: 425,903

[22] Filed: Apr. 20, 1995

Related U.S. Application Data

[63] Continuation-in-part of Ser. No. 370,807, Jan. 10, 1995, Pat. No. 5,538,173.

[51] Int. Cl.$^6$ ................................................ B23K 37/053
[52] U.S. Cl. ........................ 228/212; 228/44.5; 219/61.1
[58] Field of Search ................................... 228/212, 213, 228/219, 445, 49.3; 269/48.1; 219/61.1, 61.11, 61.13, 61.7

[56] References Cited

U.S. PATENT DOCUMENTS

| | | | |
|---|---|---|---|
| 2,129,704 | 9/1938 | Meyer | 285/33 |
| 2,433,296 | 12/1947 | Schaefer | 228/42 |
| 2,777,048 | 1/1957 | Kocks | 219/161 |
| 2,917,114 | 12/1959 | Levendoski | 166/139 |
| 2,994,381 | 8/1961 | Brown | 166/208 |
| 3,255,822 | 6/1966 | Conrad | 166/55.3 |
| 3,439,940 | 4/1969 | Nunlist | 285/10 |
| 3,873,798 | 3/1975 | Friedman et al. | 219/60 A |
| 3,916,282 | 10/1975 | Rothermel | 363/25 |
| 3,960,311 | 6/1976 | Griffiths | 228/49.3 |
| 4,019,016 | 4/1977 | Friedman et al. | 219/125.12 |
| 4,301,355 | 11/1981 | Kimbrough et al. | 219/137 PS |
| 4,344,553 | 8/1982 | Lesher et al. | 226/168 |
| 4,372,474 | 2/1983 | Taff | 228/29 |
| 4,386,726 | 6/1983 | Taff | 228/29 |
| 4,405,075 | 9/1983 | Roddy | 228/49.3 |
| 4,631,385 | 12/1986 | Rothermel | 219/124.03 |
| 4,776,507 | 10/1988 | Hoffmann | 228/42 |
| 4,780,594 | 10/1988 | Rothermel | 219/137.71 |
| 4,867,368 | 9/1989 | Tesch | 228/49.3 |
| 5,235,152 | 8/1993 | Jankus | 219/74 |
| 5,398,862 | 3/1995 | Aleman | 228/49.3 |

FOREIGN PATENT DOCUMENTS 1191237  11/1985  U.S.S.R.

OTHER PUBLICATIONS

Tube–a–Liner™. . . from Dearmanl!, Cogsdill Tool Products, Inc., Flyer No. D943A, no date.

Primary Examiner—Samuel M. Heinrich
Attorney, Agent, or Firm—Donald R. Fraser

[57] ABSTRACT

An expandable tool for holding and aligning pipes to be welded together is disclosed. The tool includes an annual array of radially movable gripping elements for engagement with the interior wall of the pipes to be welded. A wedge is mounted for axial movement relative to the gripping elements to effect selective radial outward movement of the gripping elements to align and hold the pipes for welding. The gripping elements are provided with passageways for delivery gas to preselected zones between the gripping elements and the interior wall surfaces of the pipes in the regions to be welded.

10 Claims, 4 Drawing Sheets

5,609,291

EXPANDABLE TOOL FOR HOLDING AND ALIGNING PIPES TO BE WELDED

This is a continuation-in-part application of application Ser. No. 08/370,807 filed Jan. 10, 1995, now U.S. Pat. No. 5,538,173.

BACKGROUND OF THE INVENTION

1. Brief Description of the Prior Art

Automatic welding systems for effecting an annular weld about the exterior or interior of pipes or tubes being butt welded together are known. Typically, such welding systems include means for effecting annular travel of the welding torch head about the exterior or interior of the junction of the pipes to be joined.

Amongst the systems which have been proven to obtain the above objectives are the systems illustrated and described in U.S. Pat. No. 3,873,798 to Friedman et al; U.S. Pat. No. 4,344,553 to Lesher et al; U.S. Pat. No. 4,372,474 to Taff; and U.S. Pat. No. 4,386,726 to Taff.

With the increased requirement for the use of stainless steel and high alloy pipes, tubes, and fittings, in the medical, pharmaceutical, food processing, beverage, and dairy fields, welding systems capable of providing an inert atmosphere or non oxidizing atmospheres adjacent the welding zone were required.

2. Summary of the Invention

With the aforementioned considerations, the present invention has as an object to produce an improved tool for aligning and holding two pipes in butting relationship preparatory to welding and providing an inert atmosphere adjacent the welding zone.

Another object of the invention is to produce an expandable tool for aligning and holding pipes during welding thereof.

Another object of the invention is to produce an expandable tool for aligning and holding pipes and providing an inert atmosphere adjacent the welding zone.

Another object of the invention is to produce an improved tool for aligning and holding pipes during the welding thereof and providing an inert gas environment adjacent the welding zone and militating against the escape of the gas from the zone.

Another object of the invention is to produce an improved tool for aligning and holding pipes during the welding thereof which is capable of introducing an inert gas to the welding zone to prevent the oxidation of elements such as chromium in the base material.

Another object of the invention is to produce an improved tool for aligning and holding pipes during the welding thereof and is capable of efficiently directing and concentrating inert gas adjacent the weld zone.

Still another object of the invention is to produce an improved tool for aligning and holding pipes during the welding thereof which is simple in structure and will reduce the normal setup and alignment time and increase the attendant production.

Another object of the invention is to produce an improved tool for aligning and holding pipes during the welding thereof and simultaneously is capable of directing an inert purge gas to efficiently flood the zone adjacent the weld during the welding operation.

The above as well as other objectives of the invention are achieved by an expandable tool including an annular array of radially movable gripping members for engagement with and alignment of pipes to be welded wherein the gripping members cooperate to define a predetermined zone adjacent the inner surfaces of the ends of the pipes to be welded through appropriately formed passageways which establish communication with a source of inert gas and the predetermined zone adjacent the weld to be formed.

BRIEF DESCRIPTION OF THE DRAWINGS

The above objects and advantages of the invention will become readily apparent to one skilled in the art from reading the following detailed description of a preferred embodiment of the invention when considered in the light of the accompanying drawing, in which.

DETAILED DESCRIPTION OF THE PREFERRED EMBODIMENT

Figure 1:
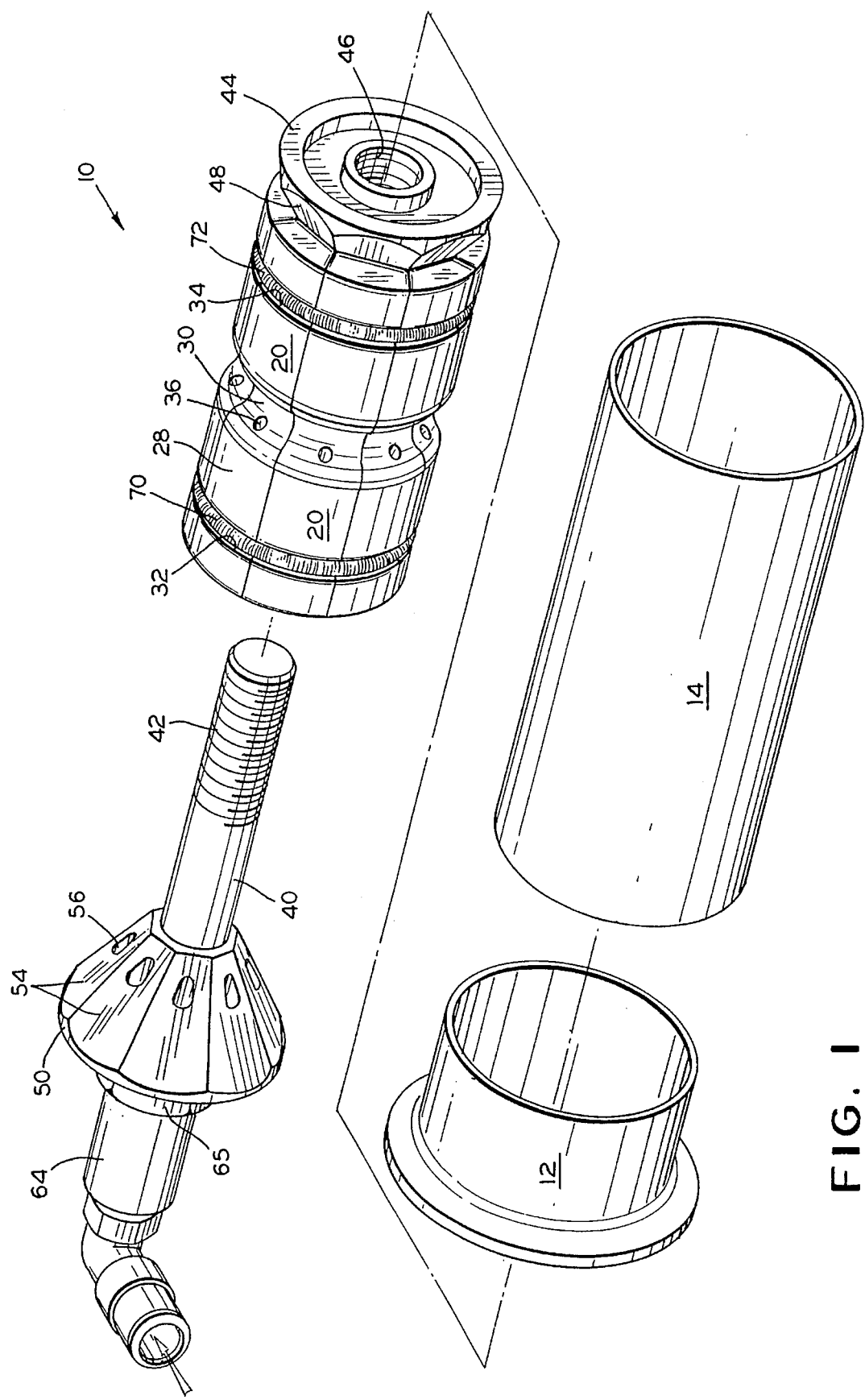
FIG. 1 is an exploded perspective view of a tool incorporating the features of the invention and associated pipes to be welded.
Figure 2:
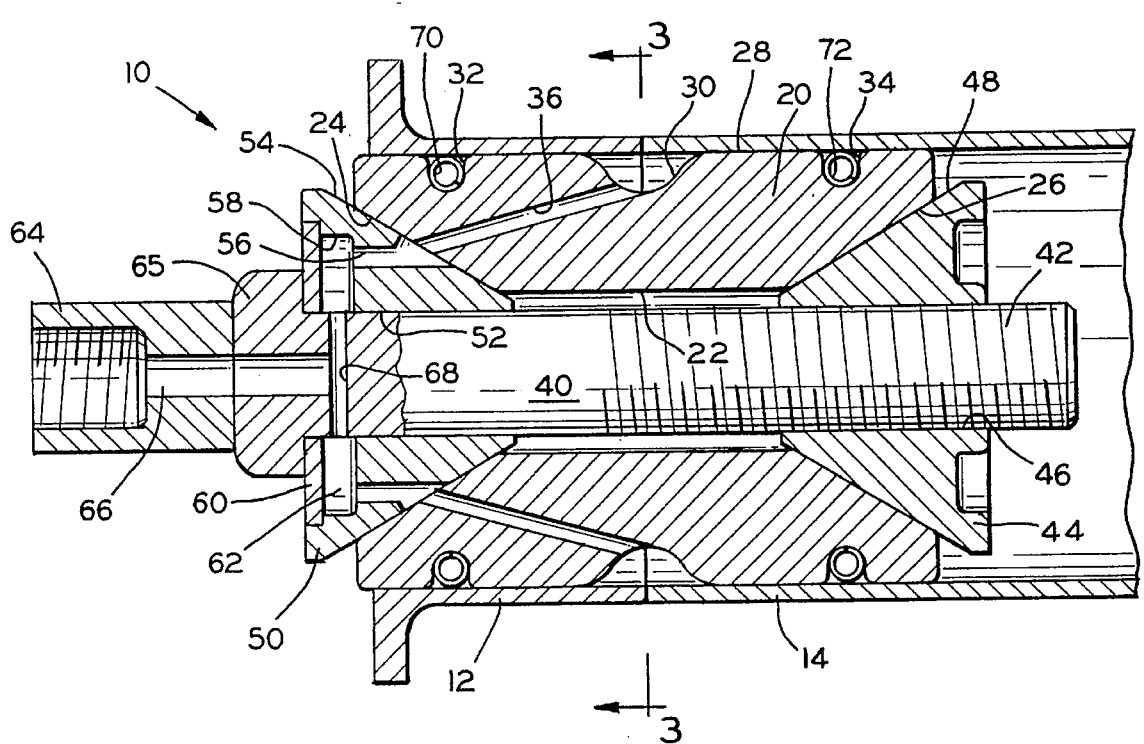
FIG. 2 is an enlarged fragmentary sectional view of the assembled form of the tool illustrated in FIG. 1 in an operative position within the interior of the pipes to be welded.
Figure 3:
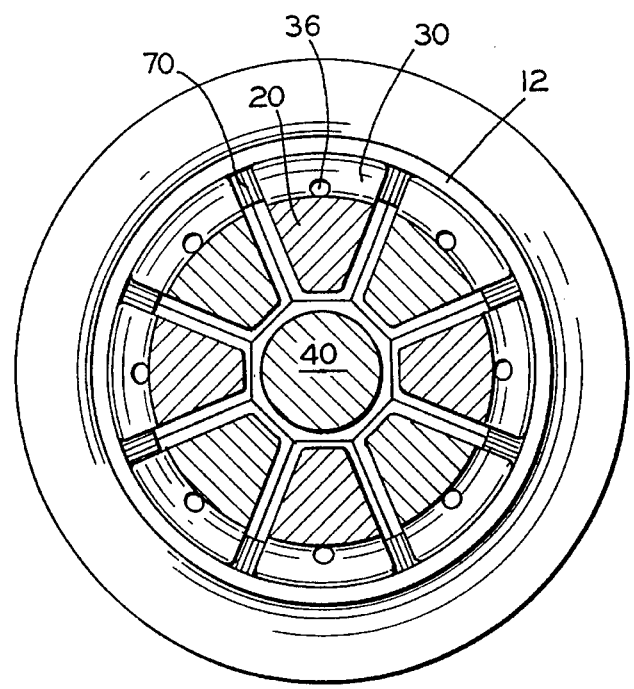
FIG. 3 is a sectional view of the apparatus illustrated in FIG. 2 taken along line 3—3 thereof.

Referring to the FIGS. 1, 2, and 3, there is shown a tool indicated generally by reference numeral 10 and pipes 12 and 14 to be aligned and held in position during a welding operation.

The tool 10 includes an array of gripping members 20. Each of the gripping members 20 is relatively elongate in form, and provided with an innermost surface 22 which terminates in opposing inclined surfaces 24 and 26. Each of the members 20 is also provided with an outermost surface 28 which is adapted to grippingly contact the inner surface of pipes to be welded together as will be discussed hereinafter.

The outermost surface 28 of the members 20 is formed with a central valley or groove 30 and spaced apart spring receiving grooves 32 and 34.

A gas passageway 36 is formed in each of the members 20 which is adapted to extend from the inclined surface 24 adjacent one end of the member 20 and terminate within the valley 30.

In cross-section, as illustrated in FIG. 3, each of the members 30 has truncated triangular shape wherein the outermost surface 28 is curved and forms the base of the truncated triangle. While the curvature of the outermost surface 28 is not deemed to be critical, it is believed that ideally the surface 28 should be formed on the same radius as the radius of the interior surface of the pipes with which the tool is to be used. Also, the degree or amount of overall contact between the outer surface 28 and the inner surface of the associated pipes will be a function of the gas purging economy of the tool.

The tool 10 includes a centrally disposed elongate shaft 40, one end of which is provided with externally formed threads 42 adapted to threadably receive a conical wedge member 44 provided with an internally threaded bore 46. The outer surface of the wedge member 44 has a plurality of wedge shaped lands 48 which are adapted to extend nearly the full length of the member 44. The lands 48 are angularly disposed relative to the longitudinal axis of the shaft 40 substantially the reciprocal of the angle of the inclined surface 26 of the members 20.

A conical wedge member 50 is disposed at the opposite end of the shaft 40 and is provided with a central bore 52 of a slightly larger diameter than the outer diameter of the unthreaded portion of the shaft 40. Thus, the shaft 40 may rotate relative to the member 50. The outer surface of the wedge member 50 has a plurality of wedge shaped lands 54 which are adapted to extend nearly the full length of the member 50. The lands 54 are angularly disposed relative to the longitudinal axis of the shaft 40 substantially the reciprocal of the angle of the inclined surface 24 of the members 20.

The wedge member 50 is provided with a plurality of gas passageways 56 and an annular stepped recess 58. An annular cover 60 is adapted to fit within the stepped recess 58 to form a gas manifold.

The unthreaded portion of the shaft 40 terminates in a coupling 64 adapted to communicate with a remote source of purge gas. The coupling 64 is provided with a wrench receiving portion 65 which may be employed during the assembly of the tool 10 into and out of operative position. The purge gas communicates with the manifold 62 through a central bore 66 which terminates in radially outwardly extending passageways 68.

In the assembled form of the invention as illustrated in FIGS. 2 and 3, it will be noted that the gripping members 20 are disposed in an annular array about the center shaft 40. The inclined surfaces 24 and 26 of the members 20 are urged into contact with lands 48 and 54 of the spaced apart wedges 44 and 50, respectively, by tension springs, 70 and 72 disposed within the grooves 32 and 34, respectively.

In operation, the tool 10 is initially adjusted by suitable spacing of the wedge members 44 and 50 to cause the outermost surfaces 28 of the gripping members 20 to assume a configuration of size permitting insertion into the interior of pipes 12 and 14. The butting ends of the pipes 12 and 14 are positioned over the annular valley 30 formed in the outermost surfaces 28 of the annular array of assembled gripping members 20.

The shaft 40 is then rotated relative to the wedge member 44 causing the spacing between the wedge members 44 and 50 to decrease As the distance decreases, the interacting camming actions of lands 48 and 54 and the respective lands 26 and 24 of the gripping member 20 causes the outer surfaces 28 of the gripping members 20 to move radially outward into tight gripping relation with the interior surfaces of the pipes 12 and 14. Such action aligns the pipes 12 and 14 and holds them in butting relation preparatory to welding.

The next step in the sequence of operation involves the placement of suitable welding equipment adjacent the zone to be welded. It has been found that orbital welding machines can be satisfactorily employed.

At this point in the operation of the tool 10, a purging gas is introduced through the coupling 64, the bore 66, the passageways 68, manifold chamber 62, the passageways 56, 36, and finally into the zone defined by the valley or groove 30 and the facing interior surfaces of the butting ends of the pipes 12 and 14. The purging gas tends to migrate outwardly of the interior zone, thus providing an inert atmosphere suitable for welding stainless steel and other metals which require such inert atmosphere.

Upon completion of the formation of the weld, a wrench may be applied to the wrench receiving portion 65 of the coupling and is turned to cause the shaft 40 to rotate relative to the wedge member 44 causing the distance or spacing between the wedge member 44 and 50 to increase and thereby allowing the springs 70 and 72 to compress the gripping members 20 and release the tool 10 from the welded pipes 12 and 14. The tool 10 may then be removed.

Figure 4:
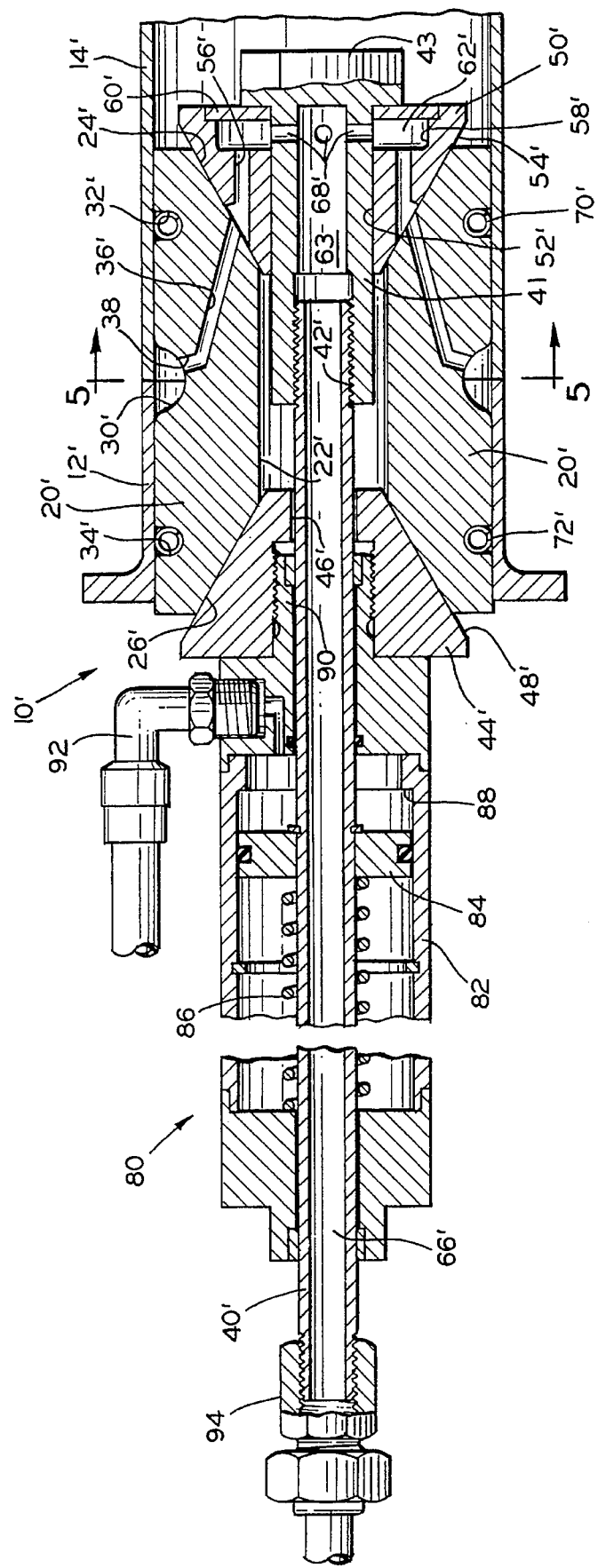
FIG. 4 is an elevational sectional view of an embodiment of the invention illustrated in FIGS. 1, 2, and 3 wherein the tool is provided with a pressure fluid actuated motor for automatically actuating the gripping members.
Figure 5:
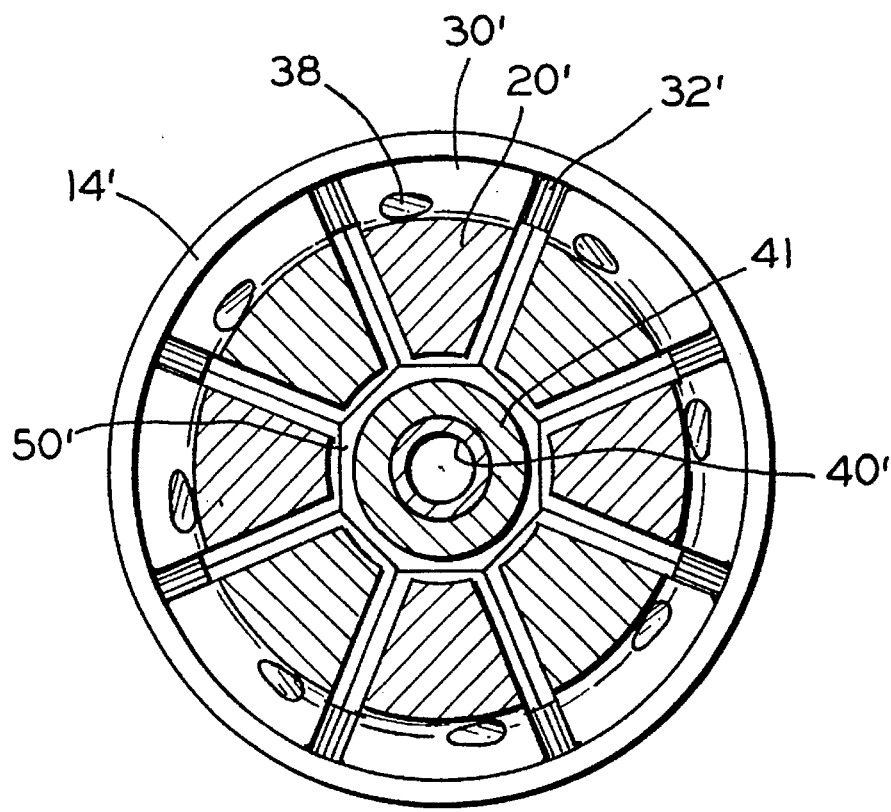
FIG. 5 is a sectional view of the gripping members taken along line 5—5 of FIG. 4.
Figure 6:
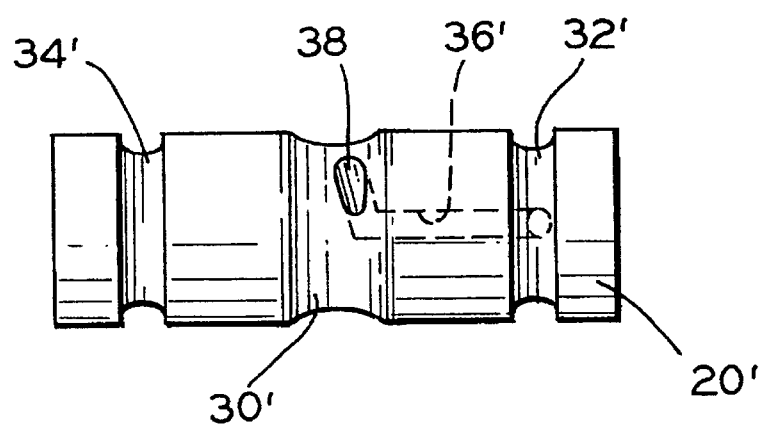
FIG. 6 is a plan view of a gripping member of the tool illustrated in FIGS. 4 and 5 showing the exit path of the purge gas passageway.

Referring to the FIGS. 4, 5, and 6, there is shown an embodiment of the tool illustrated in FIGS. 1, 2, and 3. Prime reference numerals are used in FIG. 4, 5, and 6 to indicate the same components as the tool illustrated in FIGS. 1, 2, and 3.

The tool is generally indicated by reference numeral 10' and the pipes to be aligned are designed by reference numeral 12' and 14'.

The tool 10' includes an array of gripping members 20'. Each of the gripping members 20' is relatively elongate in form, and provided with an innermost surface 22' which terminates in opposing inclined surfaces 24' and 26'. Each of the members 20' is also provided with an outermost surface 28' adapted to grippingly contact the inner surface of pipes to be welded together.

The outermost surface 28' of the members 20' is formed with a central valley or groove 30' and spaced apart spring receiving grooves 32' and 34'.

A gas passageway 36' is formed in each of the members 20' which is adapted to extend from the inclined surface 24' adjacent one end of the member 20' and terminate within the valley 30'. The passageway 36' is formed to exit through an outlet section 38 which is positioned to cause the exiting gas to travel in a somewhat annular helical path. It is believed that such a path of travel will most effectively and efficiently purge the weld zone to produce the sought after acceptable welds, particularly with stainless steel and other chromium containing alloys.

In cross-section, as illustrated in FIG. 5, it will be noted that the members 20' are truncated triangular in shape wherein the outermost surface 28' is curved and forms the base of the truncated triangle. While the curvature of the outermost surface 28' is not deemed to be critical, it is believed that ideally the surface 28' should be formed on the same radius as the radius of the interior surface of the pipes with which the tool is to be used. Also, the degree or amount of overall contact between the outer surface 28' and the inner surface of the associated pipes will be a function of the gas purging economy of the tool.

The tool 10' includes a centrally disposed elongate shaft 40', one end of which is provided with externally formed threads 42' adapted to threadably receive an internally threaded member 41 having a wrench receiving hex shaped head portion 43. The member 41 is adapted to receive a conical wedge member 50'. The member 50' is provided with a central bore 52' of a slightly larger diameter than the outer diameter of the unthreaded portion of the member 41. Thus, the member 41 may move relative to the member 50'. The outer surface of the wedge member 50' has a plurality of wedge shaped lands 54' which are adapted to extend nearly the full length of the member 50'. The lands 54' are angularly disposed relative to the longitudinal axis of the shaft 40' substantially the reciprocal of the angle of the inclined surface 24' of the members 20'.

The wedge member 50' is provided with a plurality of gas passageways 56' and an annular stepped recess 58'. An annular cover 60' is adapted to fit within the stepped recess 58' to form a gas manifold 62'. The passageways 56' are adapted to communicate with the gas passageways 36' of the respective members 20' and also with the gas manifold 62' of the member 50'. The manifold 62' further communicates with an interior bore 63 of the member 41 through radially extending passageways 68'.

The opposite portion of the shaft 40' extends through a central bore 46' of a wedge member 44'. The outer surface of the wedge member 44' has a plurality of wedge shaped lands 48' adapted to extend nearly the full length of the member 44'. The lands 48' are angularly disposed relative to the longitudinal axis of the shaft 40' substantially the reciprocal of the angle of the inclined surface 26' of the member 20'. The shaft 40' terminates in a coupling 64 adapted to communicate with a remote source of purge gas. The purge gas communicates with the manifold 62' through a central bore 66' of the shaft 40' and the bore 63 of the member 41 which terminates in the radially outwardly extending passageways 68'.

A pressure fluid operated actuator motor 80 is mounted adjacent the tool 10' and is adapted to reciprocatively drive the shaft 45'. More specifically, it will be noted that the motor 80 includes an outer housing 82 defining an inner chamber containing a piston 84. The piston 84 is secured to the shaft 40' in any of the known manners. The helical spring 86 is positioned to normally urge the piston 84 against an inwardly depending shoulder 88 of the housing 82.

The one end of the housing 82 is formed with an axially outwardly extending hollow neck 90 which is provided with externally formed threads adapted to receive corresponding threads formed on hollow interior portion of the member 44'. The threaded engagement between the neck 90 of the motor 80 and the member 44' of the tool 10' enables the motor 80 to actuate the wedge members 44' and 50' to radially move the gripping members 20' as will be described hereinafter.

A pressure fluid coupling 92 is attached to the housing 82 to provide communication between a remote source of pressure fluid and the interior of the housing 82.

A pressure fluid coupling 94 is attached to the inlet end of the shaft 40' to provide communication between a remote source of purge gas and the annular valley or groove 30' through the central bore 66' of the shaft 40', the interior bore 63 of the member 41, the radially extending passageways 68', the manifold chamber 62', the passageways 56' of the wedge element 50', and the passageways 36' and 38 of the gripping elements 20'.

In the assembled form of the invention as illustrated in FIGS. 4 and 5, it will be noted that the gripping members 20' are disposed in an annular array about the longitudinal axis of the center shaft 40'. The inclined surfaces 24' and 26' of the members 20' are urged into contact with lands 48' and 54' of the spaced apart wedge members 44' and 50', respectively, by tension springs, 70' and 72' disposed within the grooves 32' and 34, respectively in a condition where the gripping members 20' are urged into the most radially inward position by the helical springs 70' and 72' wherein adjacent side walls of the gripping members are in physical contact with one another. Such relative positioning is also caused by the fact the chamber within the housing 82 of the actuator motor 80 is at atmosphere or at sufficiently low pressure to allow the spring 86 to force the piston 84 against the shoulder 88. Simultaneously, the shaft 40' and the associated wedge member 50' are caused to be moved to a position affording sufficient spacing between the wedge members 44' and 50' to enable the gripping members 20' to collapse to a relative position permitting the tool to be inserted within the interior of the pipes 12' and 14' to be welded together.

When the annular valley or groove 30' is disposed in alignment with the butting ends of the pipes 12' and 14', pressure fluid is introduced into the actuator motor 80 through the coupling 92. The pressure fluid causes the piston 84 and the associated shaft 40' to move to compress the spring 86 and simultaneously to move the wedge member 50'. Since the wedge member 44' is stationary relative to the wedge member 50', the movement of the wedge member 50' effectively reduces the distance between the members 44' and 50' thereby causing the gripping members 20' to be cammed outwardly to effect intimate gripping contact between the outer surfaces of the members 20' and the inner surfaces of the pipes 12' and 14'. Also, it will be appreciated that with the radially outward movement of the gripping members 20', the valleys or grooves 30' are moved outwardly in unison to define an annular zone adjacent to the butting edges of the pipes.

The next step in the sequence of operation involves the placement of suitable welding equipment adjacent the zone to be welded. It has been found that orbital welding machines can be satisfactorily employed.

At this point in the operation of the tool 10', a purging gas is introduced through the coupling 94, the bore 66', the passageways 68', manifold chamber 62', the passageways 56', 36', 38, and finally into the zone defined by the valleys or grooves 30' and the facing interior surfaces of the butting ends of the pipes 12' and 14'. The purging gas tends to travel in a helical annular path through the valleys or grooves 30', thus providing an inert atmosphere suitable for welding stainless steel and other metals which require such inert atmosphere.

Upon completion of the weld, the pressure fluid within the actuator housing 82 is vented causing the spring 86 to move the piston 84 to its normal position against the shoulder 88. Simultaneously with the movement of the piston 84, the shaft 40' and the associated wedge member 50' are caused to move axially permitting the gripping members 20' to move radially inwardly and thereby uncouple the tool 10' from the now welded together pipes 12' and 14'.

One of the advantages of the automatic tool 10' is the ability to operate the actuating motor 80 and effectively provide an inert purge gas to the weld zone from the same remote source. This is possible due to the purge gas efficiency and the requirement for only a relatively low pressure to operate the actuating motor 80.

In accordance with the provisions of the patent statutes, the present invention has been described in what is considered to represent its preferred embodiment. However, it should be understood that the invention can be practiced otherwise than as specifically illustrated and described without departing from its spirit or scope.

What is claimed is:

1. An expandable tool for axially aligning and holding pipes during the welding of the abutting ends of the pipes including:

an annular array of radially movable gripping members for engagement with and alignment of the pipes to be welded, said members cooperating to define a predetermined zone adjacent inner surfaces of the ends of the pipes to be welded, said members provided with passageways to establish communication between a source of gas and the predetermined zone, the outwardly facing surfaces of said members formed with at least one peripherally aligned groove; and means for selectively radially moving said gripping members.

2. An expandable tool as defined in claim 1 including extension spring means seated in said groove.

3. An expandable tool as defined in claim 1 wherein said means for selectively radially moving said gripping means includes at least a wedge shaped element provided with internal passageways alignable with the passageways in said gripping members.

4. An expandable tool as defined in claim 1 wherein said gripping members include a radially outwardly facing surface provided with groove means cooperating to define the predetermined zone; said passageways terminate in said groove means; said means selectively radially moving said gripping members includes at least one wedge member movable relative to said gripping members; and said wedge member includes passageways disposed between and communicating with the source of gas and the predetermined zone.

5. An expandable tool as defined in claim 4 wherein the gas is caused to travel in an annular helical path through said groove means.

6. An expandable tool as defined in claim 4 wherein said passageways direct the gas to travel in an annular helical path in said groove means.

7. An expandable tool as defined in claim 1 wherein said means for selectively radially moving said gripping members includes a pressure fluid actuated motor in selective communication with the source of gas.

8. A method of purging the interior of a weld zone between the ends of two pipes to be welded comprising the steps of:

1) providing a source of purge gas;

2) directing the purge gas to the weld zone adjacent the inner ends of the pipes to be welded and causing the purge gas to continuously flow in an annular path past the inner surfaces of the pipes to be welded during the welding operation; and 3) allowing the purge gas to exit the weld zone to continuously remove oxygen and heat energy therefrom.

9. A method of purging the interior of a weld zone in accordance with claim 8 wherein the purge gas is caused to flow in a radially outward path as it is introduced to the weld zone.

10. A method of purging the interior of a weld zone in accordance with claim 8 wherein the purge gas is caused to flow helically in an annular path generally parallel to the weld zone between the ends of the pipes to be welded.

\* \* \* \* \*